United States Patent Office 2,828,860
Patented Apr. 1, 1958

2,828,860

PROCESS OF SORTING DRIED PEAS

Herman J. Morris, Berkeley, Calif., assignor to the United States of America as represented by the Secretary of Agriculture No Drawing. Application May 9, 1955
Serial No. 507,188

4 Claims. (Cl. 209—4)

(Granted under Title 35, U. S. Code (1952), sec. 266)

A non-exclusive, irrevocable, royalty-free license in the invention described for all governmental purposes, throughout the world, with the power to grant sublicenses for such purposes, is hereby granted to the Government of the United States of America.

This invention relates to methods of sorting dried peas. A particular object of the invention is the provision of methods whereby lots of dried peas containing both green and yellow peas can be separated into a fraction containing the green peas and another fraction containing the yellow peas. Further objects and advantages of the invention will be evident from the disclosure herein.

The invention is of particular importance in connection with the production of split peas and hence its use in this connection will be explained at length below. It is to be understood however that the process of the invention can be used for sorting dried peas regardless of the ultimate use of the sorted peas.

In the production of split peas, the following procedure is commonly employed:

Peas are grown in the usual manner, the plants being allowed to remain in the field until the peas in the pods are completely mature and dry. The peas are then harvested, the individual peas being separated from the pods and vines.

The harvest dried peas are then subjected to grading and cleaning operations to separate undesired materials such as weevilly peas, wrinkled peas, stones, and other debris.

The cleaned peas are subjected to steaming followed by storing for several hours to soften the skins. The resulting tempered peas are then subjected to rubbing action, for example, between discs rotating at slightly different speeds to remove the skins from the cotelydons.

The cotelydons are screened to remove skins, embryos, and broken cotelydons then steamed to further bring out their color and finally tumbled to polish them. The individual cotelydons are commonly referred to as split peas.

Split peas may be either yellow or green depending on the color of the variety of pea used; yellow cotelydon varieties producing yellow split peas and green cotelydon varieties producing green split peas. However it has long been known that it is virtually impossible to obtain green split peas entirely free from yellow spit peas. Thus when the green cotelydon varieties are harvested it will be observed that although the majority of individual dried peas are green, a minor proportion of the lot will be completely yellow or of a yellowish cast. The percentage of such yellow peas (referred to commonly in the industry as percent of bleach) will vary from as low as 1% to as high as 35% depending on locality where grown, climatic conditions during growth and ripening, and other factors. Crops containing a very small percentage of the yellow peas command a maximum price, whereas crops of high percentages of yellow peas command lower prices. It is therefore obvious that it is desirable to be able to separate the yellow from the green peas. It may be noted that it is generally believed in agricultural circles that the yellow peas which occur as impurities in the crop containing mostly green peas were originally green but turn yellow due to environmental conditions—perhaps overexposure to the sun or the like. It is not believed that genetic factors play a part in the occurrence of yellow peas. However as far as the practical application of this invention is concerned, it is immaterial what causes the formation of the yellow peas commingled with the green peas.

Various methods for sorting dried peas have been advocated. For example, methods utilizing photoelectric mechanisms will make a satisfactory separation of yellow and green peas. However the equipment required for doing so is so expensive as not to be a truly practical answer to the problem.

It has now been found that yellow and green peas, having essentially the same density and contained in a mixture of peas consisting essentially of dried yellow and dried green peas, can be separated from each other by utilizing the principles of density fractionation, provided that the mixture of peas is first soaked in water to cause a preferential decreasing of the density of the yellow peas.

This situation is further explained as follows:

If the mixture of dried green and yellow peas is directly subjected to density fractionation as by placing it in a brine of pre-determined density, no useful result is achieved because both the green and yellow peas have exactly the same density and the mixture will float or sink (depending on the density of the brine) as a unit with no separation taking place.

It has now been found, however, that by soaking the peas in water before conducting the density fractionation, the situation is completely changed and separation is achieved. Thus when the mixture of green and yellow peas is contacted with water, both types of peas take up water but the yellow peas take up the water much faster than do the green peas. As a result the yellow peas swell and assume a lower density than the green peas. Thus if the mixture of peas is soaked in water and then placed in a brine of predetermined density the peas which float in the brine will consist mostly of yellow peas whereas the peas which sink will consist mostly of green peas. The floating and sinking fractions are mechanically separated from the brine to complete the operation.

The soaking of the mixed dried peas to establish a difference in density between the green peas and the yellow peas can be accomplished in many ways. Thus the peas may be immersed in a vessel of water and agitation may be applied to achieve good contact between the peas and the water. The peas may be supported on screens while they are subjected to streams or sprays of water. Other methods of accomplishing this soaking will be obvious to those skilled in the art. Usually for the sake of convenience the water used for soaking is at about room temperature and under such conditions, a contacting of the water and the peas for about 30 minutes will in many cases bring about a maximum difference in density between the green peas and yellow peas. The time of 30 minutes is not critical by any means and in general the time of soaking can be in the range from about 5 to about 60 minutes. The time of soaking which gives optimum difference in density between the green and yellow peas will vary with different varieties of peas, their moisture content, age of storage and other factors. Generally, the time of soaking for any particular lot can easily be determined by immersing the peas in water and withdrawing samples from time to time and placing the peas in a brine having a specific gravity about 1.25 and noting whether or not a satisfactory separation of green and yellow peas is achieved. If the soaking has not established a sufficient difference in density between the green and yellow peas, the soaking is continued for a time and the test repeated. By repeating these steps the optimum time of soaking can be readily determined. Usually the water used for soaking is about at room temperature for convenience. If desired the water may be warmer or cooler without any disadvantage or particular advantage.

After the peas have been soaked the green and yellow peas are separated by any of various techniques which are adapted for separation of mixtures by reason of differences in density of the individual particles or pieces which make up the mixture. Such procedures may be referred to generically as density fractionation. A preferred technique for accomplishing this separation, or fractionation as it may be called, involves subjecting the mixture to the buoyant effect of a liquid medium of pre-determined density. Thus the peas are placed in a brine (solution of calcium chloride in water) which has such a density that the green peas will sink whereas the yellow peas will float. The fraction of peas which float in the brine and the fraction of peas which sink in the brine are then separately removed from the brine to complete the separation. Usually a brine having a specific gravity of about 1.25 is preferred but in general, brines having a specific gravity in the range of about 1.1 to about 1.35 may be used.

In the fractionation in a liquid medium as described above, it is usually preferred to use a solution of calcium chloride as the fractionating medium. Calcium chloride is inexpensive, non-toxic, and is soluble enough in water so that the desired density of solution may be obtained. However it is not essential to use a solution of calcium chloride and any other non-toxic liquid medium of the proper density may be employed—the essential attribute of the medium is its density, not its chemical composition. Examples of solutes which may be added to water to produce a fractionating medium are sodium chloride, potassium chloride, sucrose, dextrose, sodium citrate, sodium sulphate, sodium potassium tartrate, glycerine, etc.

If desired, the fractionation in a liquid medium may be applied more than once to obtain completely monochromatic fractions. Thus the sinker fraction from the first fractionation may be again subjected to the density fractionation to obtain a green pea fraction completely free from yellow peas.

After the pea fractions are separated from the brine or other liquid medium used in the fractionation, they are subjected to water washing to remove the medium from the surface of the peas.

Although it is preferred to use a fractionation technique based on the buoyant action of a liquid medium, it is not essential to use such a scheme. Thus for instance the soaked peas may be fractionated by a pneumatic method. In this technique, the peas are individually propelled into the air in a horizontal direction, each with uniform force whereby the peas will be deposited at varying distances from the point of propulsion. Thus the denser (green) peas will land closer to the point of propulsion whereas the less dense (yellow) peas will land at a further distance. Another technique involves establishing an upward current of water in a vessel. The mixture of peas is introduced by a screw feeder or similar mechanism into the vessel near the bottom. In this case the less dense peas will be carried up and out of the vessel by the water current whereas the denser peas will sink to the bottom of the vessel because the effect of gravity on these pieces exceeds the force of the upward current on the particles.

It is obvious that the soaking and gravity fractionation procedures applied to the dried peas will increase their moisture content. Thus dried peas generally contain about 5 to 15% moisture and after the soaking and fractionation in a liquid medium, the peas will have a moisture content on the order of 10% to 30%, depending on how long a soaking period was used. Also it is to be noted that the moisture content of the individual peas will vary widely. Where the peas are to be used for preparing split peas, the increased moisture content will not interfere with the usual procedure as in preparing split peas it is necessary to moisten the dried peas so that the skins will be softened and loosened so they can be removed from the cotelydons. Where the peas are not intended for manufacture into split peas but are to be stored and sold as dried peas, the excess water added may be removed by applying conventional dehydrating techniques to the peas. Thus for example they may be subjected to a current of air at a temperature of about 40–100° C. until their moisture content is reduced to about 5 to 15%.

The invention is further demonstrated by the following examples:

*Example I*

A batch of dried green peas, containing 10% yellow peas, was soaked in water at 20° C. for 30 minutes. The peas were then removed from the water, drained, and placed in a vessel containing an aqueous solution of calcium chloride having a specific gravity of 1.25. The volume of solution was approximately 3 ml. of solution per gram of peas. The peas were agitated in the calcium chloride solution for a few seconds then allowed to stand. It was observed that the peas separated into two distinct fractions—a floating fraction containing mostly yellow peas and a sinking fraction containing mostly green peas. The floating fraction was removed from the solution by scooping it out with a strainer. The solution was then poured out of the vessel and the sinking fraction recovered. The latter fraction was examined and found to constitute 86% of the original sample and contained 2.6% of yellow peas, the remainder being green peas.

*Example II*

The procedure of Example I was repeated using various soaking times and temperatures (as indicated below). The soaked peas were fractionated as in the previous example. The conditions and results are summarized below:

| Expt. | Temperature of soaking, °C. | Time of soaking, min. | Proportion of sinking fraction in relation to entire sample, percent | Proportion of yellow peas in sinking fraction, percent |
|---|---|---|---|---|
| 1 | 10 | 20 | 89 | 5.5 |
| 2 | 10 | 30 | 88 | 4.4 |
| 3 | 10 | 40 | 88 | 4.7 |
| 4 | 20 | 20 | 85 | 3.1 |
| 5 | 20 | 40 | 83 | 2.1 |
| 6 | 37 | 20 | 80 | 3.0 |
| 7 | 37 | 30 | 72 | 1.4 |
| 8 | 37 | 40 | 72 | 2.0 |

*Example III*

Three batches of dried green peas containing 30%, 21%, and 16% of yellow peas, respectively, were obtained. Each lot was fractionated as follows:

A 50-gram sample of the dried peas was soaked at 25° C. in tap water for 30 minutes. The soaked peas were drained and placed in 200 ml. of 30% calcium chloride solution (specific gravity 1.28). The peas were agitated in the solution a few seconds then allowed to stand and floaters and sinkers separated. The results are set forth below:

| Expt. | Proportion of yellow peas in original sample, percent | Proportion of sinking fraction to total sample, percent | Proportion of yellow peas in sinking fraction, percent |
|---|---|---|---|
| 1 | 30 | 60.5 | 7.3 |
| 2 | 21 | 68 | 5.3 |
| 3 | 16 | 70 | 1.0 |

Having thus described the invention, what is claimed is:

1. A process of separating green peas from yellow peas contained in a mixture of peas consisting essentially of dried green and dried yellow peas having essentially the same density, comprising soaking the mixture of peas in water until the yellow peas assume a density less than that of the green peas and thereafter subjecting the soaked peas to density fractionation and separating the less dense fraction containing mainly yellow peas from the denser fraction containing mainly green peas.

2. A process of separating green peas from yellow peas contained in a mixture of peas consisting essentially of dried green and dried yellow peas having essentially the same density, comprising soaking the mixture of peas in water for a period of time in the range from about 5 to about 60 minutes until the yellow peas assume a density less than that of the green peas and thereafter subjecting the soaked peas to density fractionation and separating the less dense fraction containing mainly yellow peas from the denser fraction containing mainly green peas.

3. A process of separating green peas from yellow peas contained in a mixture of peas consisting essentially of dried green and dried yellow peas having essentially the same density, comprising soaking the mixture of peas in water until the yellow peas assume a density less than that of the green peas and thereafter introducing the soaked peas into a liquid medium having a density such that one fraction of the peas containing mostly the yellow peas will float in the medium whereas another fraction of the peas containing mostly the green peas will sink in the medium, and separating the floating and sinking fractions.

4. A process of separating green peas from yellow peas contained in a mixture of peas consisting essentially of dried green and dried yellow peas having essentially the same density, comprising soaking the mixture of peas in water until the yellow peas assume a density less than that of the green peas and thereafter introducing the soaked peas into a liquid medium having a specific gravity in the range from about 1.1 to about 1.3, and thereafter isolating the floating fraction containing mostly yellow peas and the sinking fraction containing mostly green peas.

References Cited in the file of this patent

UNITED STATES PATENTS

| | | | |
|---|---|---|---|
| 931,120 | Hunicke | | Aug. 17, 1909 |
| 1,743,179 | Zeb | | Jan. 14, 1930 |
| 1,756,497 | Warren | | Apr. 29, 1930 |
| 1,835,634 | Chapman | | Dec. 8, 1931 |
| 1,885,987 | Chapman | | Nov. 1, 1932 |
| 1,885,988 | Chapman | | Nov. 1, 1932 |
| 1,887,239 | Hanson | | Nov. 8, 1932 |
| 1,899,632 | Olney | | Feb. 28, 1933 |